(12) United States Patent
Gafni et al.

(10) Patent No.: US 10,951,545 B2
(45) Date of Patent: Mar. 16, 2021

(54) NETWORK DEVICES

(71) Applicant: MELLANOX TECHNOLOGIES TLV LTD., Raanana (IL)

(72) Inventors: Barak Gafni, Campbell, CA (US); Lavi Koch, Tel Aviv (IL); Zvi Rechtman, Petah-Tikva (IL)

(73) Assignee: MELLANOX TECHNOLOGIES TLV LTD., Raanana (IL)

(*) Notice: Subject to any disclaimer, the term of this patent is extended or adjusted under 35 U.S.C. 154(b) by 25 days.

(21) Appl. No.: 16/383,711

(22) Filed: Apr. 15, 2019

(65) Prior Publication Data

US 2020/0328987 A1    Oct. 15, 2020

(51) Int. Cl.
*G06F 1/00* (2006.01)
*H04L 12/935* (2013.01)
*H04L 12/931* (2013.01)

(52) U.S. Cl.
CPC .............. *H04L 49/30* (2013.01); *H04L 49/35* (2013.01); *H04L 49/40* (2013.01)

(58) Field of Classification Search
CPC .......... H04L 49/30; H04L 49/35; H04L 49/40
See application file for complete search history.

(56) References Cited

U.S. PATENT DOCUMENTS

| 5,233,539 | A | 8/1993 | Agrawal et al. |
| 6,611,518 | B1 | 8/2003 | Ngo et al. |
| 9,154,860 | B2 | 10/2015 | Hessong et al. |
| 2004/0008674 | A1 | 1/2004 | Dubois |
| 2009/0043933 | A1* | 2/2009 | Bennett ............... G06F 13/4243 710/118 |
| 2018/0219889 | A1* | 8/2018 | Oliner ...................... G06N 3/08 |
| 2018/0225230 | A1* | 8/2018 | Litichever ........... G06F 9/45504 |
| 2019/0199676 | A1* | 6/2019 | Ku ....................... H04L 65/1016 |
| 2019/0363787 | A1* | 11/2019 | Edwards ............. H04J 14/0287 14/287 |
| 2020/0045049 | A1* | 2/2020 | Apostolopoulos ..... G06N 20/00 |

* cited by examiner

*Primary Examiner* — Lan-Huong Truong
(74) *Attorney, Agent, or Firm* — Kligler & Associates Patent Attorneys Ltd

(57) ABSTRACT

Apparatus including a network element including an input-output port, the input-output port including an input data lane and an output data lane, wherein the input data lane is in wired connection with a network data source external to the network element, the output data lane is in wired connection with a network data destination external to the network element, and the network data source is distinct from the network data destination. Related apparatus and methods are also described.

16 Claims, 8 Drawing Sheets

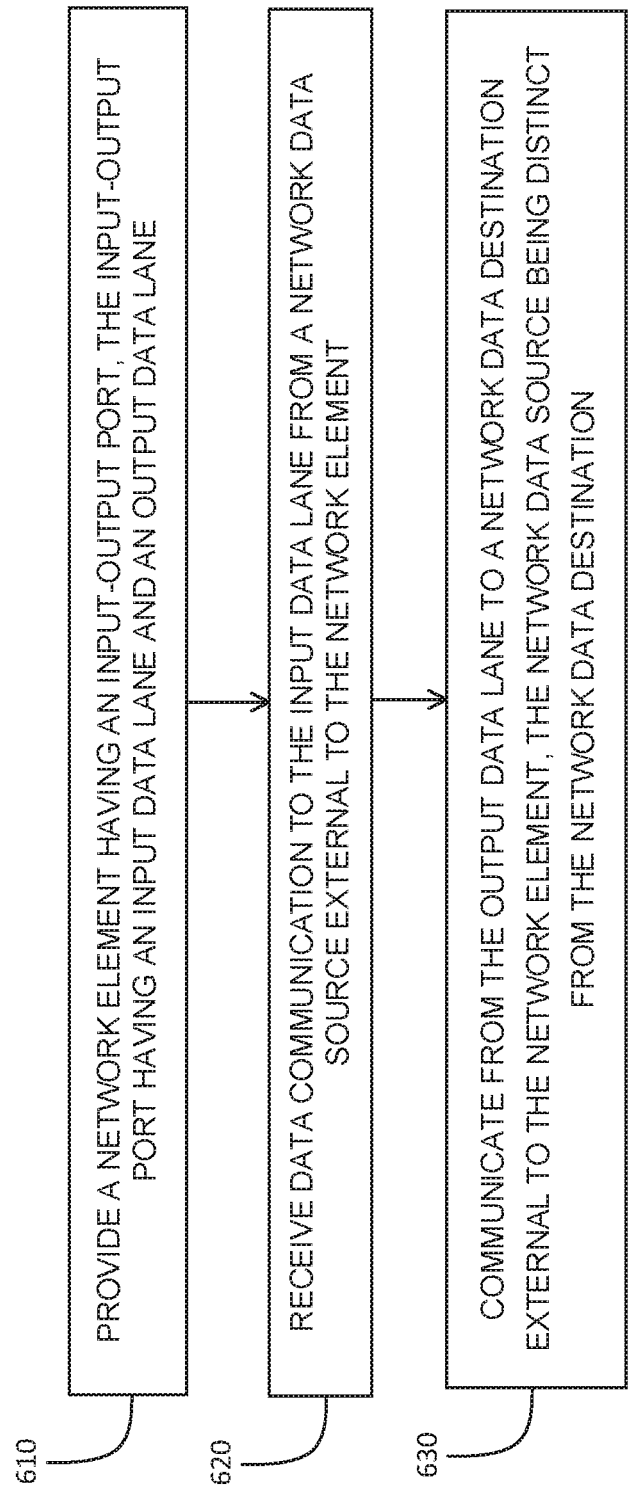

NETWORK DEVICES

FIELD OF THE INVENTION

The present invention relates to network devices, and particular but not exclusively to arrangements for attaching network devices to other devices.

BACKGROUND OF THE INVENTION

Connecting network devices, such as switches and network interface cards, to other devices is known. Such connections may be, for example, wired connections.

SUMMARY OF THE INVENTION

The present invention, in certain embodiments thereof, seeks to provide an improved system and method for connecting network devices to other devices, and particularly but not exclusively to an improved system and method for increasing throughput in such connections.

There is thus provided in accordance with an exemplary embodiment of the present invention apparatus including a network element including an input-output port, the input-output port including an input data lane and an output data lane, wherein the input data lane is in wired connection with a network data source external to the network element, the output data lane is in wired connection with a network data destination external to the network element, and the network data source is distinct from the network data destination.

Further in accordance with an exemplary embodiment of the present invention the input data lane includes a first plurality of input data lanes, the output data lane includes a second plurality of output data lanes, at least some of the first plurality of input data lanes are in wired connection with the network data source external to the network element, and at least some of the second plurality of output data lanes are in wired connection with the network data destination external to the network element.

Still further in accordance with an exemplary embodiment of the present invention the input-output port includes a plurality of input-output ports each having a first plurality of input data lanes and a second plurality of output data lanes, and for at least one of the plurality of input-output ports: at least some of the first plurality of input data lanes of the at least one of the plurality of input-output ports are in wired connection with the network data source, and at least some of the second plurality of output data lanes of the at least some of the plurality of input-output ports are in wired connection with the network data destination external to the network element.

Additionally in accordance with an exemplary embodiment of the present invention the network data source is included in a first device external to the apparatus, and the network data destination is included in a second device external to the apparatus, and the first device is distinct from the second device.

Moreover in accordance with an exemplary embodiment of the present invention the network data source is included in a first device external to the apparatus, and the network data destination is included in a second device external to the apparatus, and the first device is the same as the second device.

Further in accordance with an exemplary embodiment of the present invention the wired connection includes at least one of the following: wiring on a circuit board to which the apparatus is attached, a cable, and a patch panel.

Still further in accordance with an exemplary embodiment of the present invention the network element includes a switch.

Additionally in accordance with an exemplary embodiment of the present invention the network element includes a network interface card.

Moreover in accordance with an exemplary embodiment of the present invention the network element is configured to provide management communications via at least one of the following: a direct wired connection, and a connection via a management network.

Further in accordance with an exemplary embodiment of the present invention the network element is configured to provide a plurality of speeds by providing at least one of the following: at least one of the first plurality of input data lanes being configured to operate at a speed different from at least one other of the first plurality of input data lanes, and at least one of the second plurality of output data lanes being configured to operate at a speed different from at least one other of the second plurality of output data lanes.

There is also provided in accordance with another exemplary embodiment of the present invention a method including providing a network element including an input-output port, the input-output port including an input data lane and an output data lane, receiving data communication, via a wired connection, to the input data lane from a network data source external to the network element, and communicating from the output data lane, via a wired connection, to a network data destination external to the network element, wherein the network data source is distinct from the network data destination.

Further in accordance with an exemplary embodiment of the present invention the input data lane includes a first plurality of input data lanes, the output data lane includes a second plurality of output data lanes, and the receiving data communication includes at least some of the first plurality of input data lanes receiving data communication from the network data source external to the network element, and the communicating includes at least some of the second plurality of output data lanes sending data communication to the network data destination external to the network element.

Still further in accordance with an exemplary embodiment of the present invention the input-output port includes a plurality of input-output ports each having a first plurality of input data lanes and a second plurality of output data lanes, and for at least one of the plurality of input-output ports: the receiving data communication includes at least some of the first plurality of input data lanes of the at least one of the plurality of input-output ports receiving data communication from the network data source, and the communicating includes at least some of the second plurality of output data lanes of the at least some of the plurality of input-output ports sending data communication to the network data destination external to the network element.

Additionally in accordance with an exemplary embodiment of the present invention the network data source is included in a first device external to the apparatus, and the network data destination is included in a second device external to the apparatus, and the first device is distinct from the second device.

Moreover in accordance with an exemplary embodiment of the present invention the network data source is included in a first device external to the apparatus, and the network data destination is included in a second device external to the apparatus, and the first device is the same as the second device.

Further in accordance with an exemplary embodiment of the present invention the wired data connection includes at least one of the following: wiring on a circuit board to which the apparatus is attached, a cable, and a patch panel.

Still further in accordance with an exemplary embodiment of the present invention the network element includes a switch.

Additionally in accordance with an exemplary embodiment of the present invention the network element includes a network interface card.

Moreover in accordance with an exemplary embodiment of the present invention the method also includes the network element providing management communications via at least one of the following: a direct wired connection, and a connection via a management network.

Further in accordance with an exemplary embodiment of the present invention the method also includes the network element providing a plurality of speeds by at least one of the following: at least one of the first plurality of input data lanes being configured to operate at a speed different from at least one other of the first plurality of input data lanes, and at least one of the second plurality of output data lanes being configured to operate at a speed different from at least one other of the second plurality of output data lanes.

BRIEF DESCRIPTION OF THE DRAWINGS

The present invention will be understood and appreciated more fully from the following detailed description, taken in conjunction with the drawings in which:

FIG. 6 is a simplified flowchart diagram of an exemplary method of operation of the systems of FIGS. 2, 3A, 3B, and 3C.

DETAILED DESCRIPTION OF AN EMBODIMENT

Figure 1:
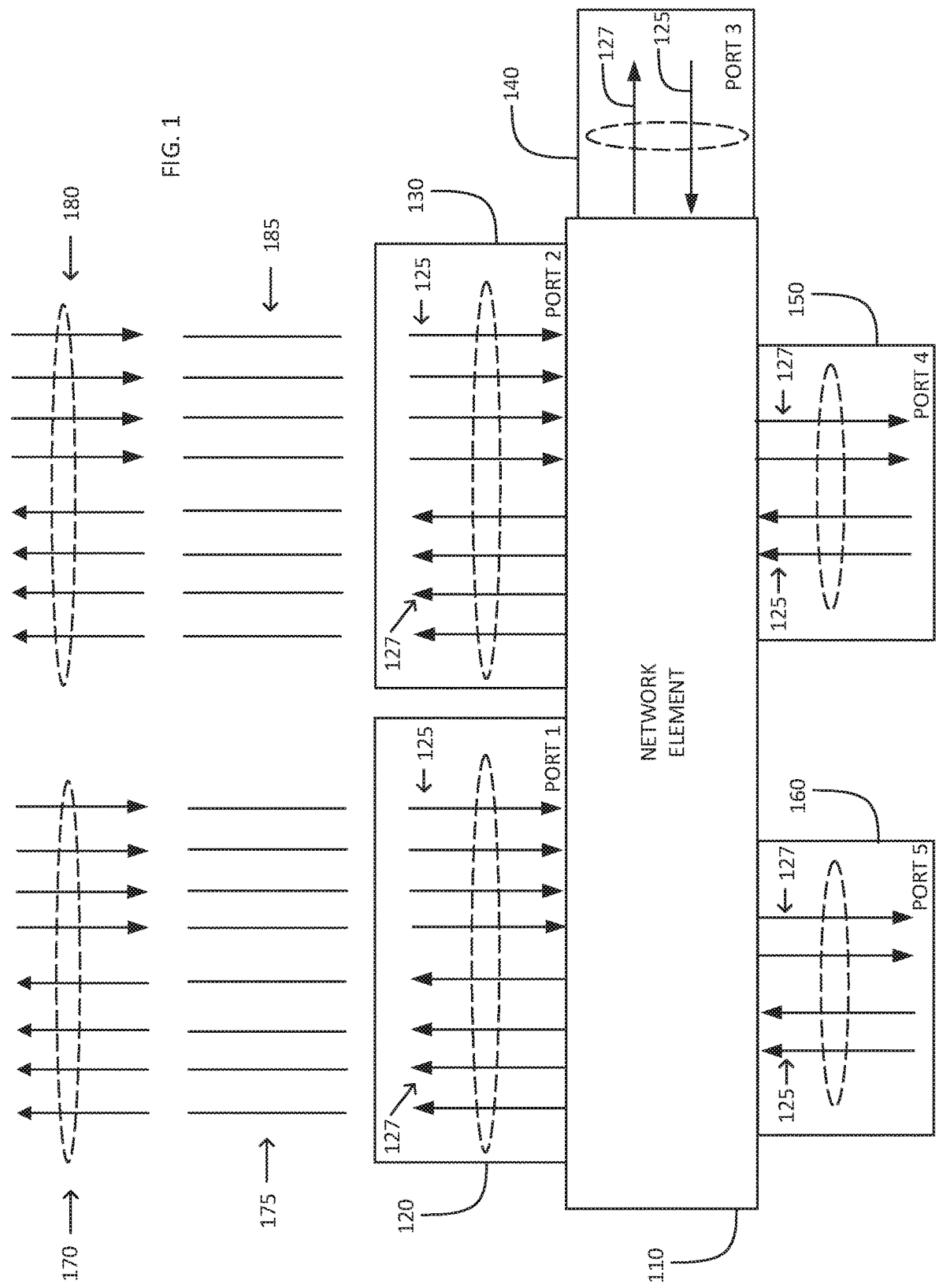
FIG. 1 is a simplified block diagram illustration of a system comprising a network element in wired connection with ports external thereto.

Reference is now made to FIG. 1, which is a simplified block diagram illustration of a system comprising a network element in wired connection with ports external thereto.

The system of FIG. 1 comprises a network element 110. By way of non-limiting example, the network element may be: a switch, such as, by way of one particular non-limiting example, a suitable switch based on a Spectrum-2 ASIC, such switches (one particular example of such a switch being a SN2700 switch) being commercially available from Mellanox Technologies Ltd.; or a network interface controller (NIC), such as, by way of one particular non-limiting example, a ConnectX-6 NIC, commercially available from Mellanox Technologies Ltd.

The network element 110 comprises at least one network port, shown in FIG. 1, by way of particular non-limiting example, as ports 1-5 having reference numerals 120, 130, 140, 150, and 160 respectively.

Each port, such as, for example port 1 (reference numeral 120) comprises a plurality of data lanes, generally an equal number of input data lanes and output data lanes; such data lanes are known in the art. By way of particular non-limiting example, in FIG. 1 port 1 (reference numeral 120) is depicted as comprising four input data lanes 125 and four output data lanes 127; port 2 (reference numeral 130) is also depicted as comprising four input data lanes 125 and four output data lanes 127. Port 3 (reference numeral 140) is depicted as comprising one input data lane 125 and one output data lane 127. Port 4 (reference numeral 150) is depicted as comprising two input data lanes 125 and two output data lanes 127; port 5 (reference numeral 160) is also depicted as comprising two input data lanes 125 and two output data lanes 127. It is appreciated that the examples regarding the number of data lanes, including the number of input data lanes 125 and the number of output data lanes 127 comprised in each port are particular non-limiting examples. Furthermore, it is appreciated that although generally any given port comprises an equal number of input data lanes 125 and output data lanes 127, exemplary embodiments of the present invention are not limited to such a case.

By way of specific non-limiting example, port 1 (reference numeral 120) is shown as connected to an external port 170 of a device external to the network element 110 via a wired connection comprising a plurality of wires 175, each one of the plurality of wires connecting one of the following: an input data lane 125 of port 1 (reference number 120) to an output data lane of the external port 170; and an output data lane 127 of port 1 (reference number 120) to a input data lane of the external port 170. The plurality of wires 175 may be comprised in a cable; may be comprised in a circuit board (not shown) on which the network element 110 is disposed; or may be comprised in a patch panel, providing connectivity between cable connected thereto.

The above discussion regarding port 1 (reference numeral 120) applies, mutatis mutandis, to port 2 (reference numeral 130), which is shown as connected to an external port 180 of a device external to the network element 110 via a wired connection comprising a plurality of wires 185.

While port 3, port 4, and port 5 (reference numerals 140, 150, and 160 respectively) are not depicted as connected to any port of any external device in FIG. 1, it is appreciated that they may be so connected.

A non-limiting example of operation of the system of FIG. 1 is now briefly described, referring by way of non-limiting example to port 1 (reference numeral 120). Data may be sent outwards from the network element 110 via the plurality of output data lanes 127 of output port 1 (reference numeral 120), and thence via (a relevant portion of) the plurality of wires 175 to input data lanes of the external port 170, for receipt thereat. Similarly, data may be sent outwards from the port 120 via output data lanes thereof, and thence via (a relevant portion of) the plurality of wires 175 to the input data lanes 125 of the external port 170, for receipt thereat and for passing on to the network element 110.

The inventors of the present invention believe that, in the system depicted and described in FIG. 1, certain inefficiencies may arise. By way of particular non-limiting example, consider port 1 (reference numeral 120), in connection with the external port 170. For the sake of the particular non-limiting example under discussion, assume that each input data lane of the input data lanes 125 can support 10 Gbps of traffic, and likewise each output data lane of the output data lanes 127 can support 10 Gbps of traffic, so that 40 Gbps of input traffic and 40 Gbps of output traffic are supported by port 1 (reference numeral 120). (It is appreciated that, in certain exemplary embodiments, different lanes may alternatively support different traffic speeds). In a particular non-limiting case of asymmetrical transfer of data between port 1 (reference numeral 120) and the external port 170, consider a case in which data is transferred outwards from the network element 110 via port 1 (reference numeral 1120) to the external port 170 via the output data lanes 120, but no data is transferred in the other direction. In the particular case described, 50% of the throughput of port 1 (reference numeral 120) is wasted, with 40 Gbps of output traffic and zero input traffic. It will be appreciated that the particular non-limiting case described in the preceding sentence is only one example, and that many other examples are possible.

Figure 2:
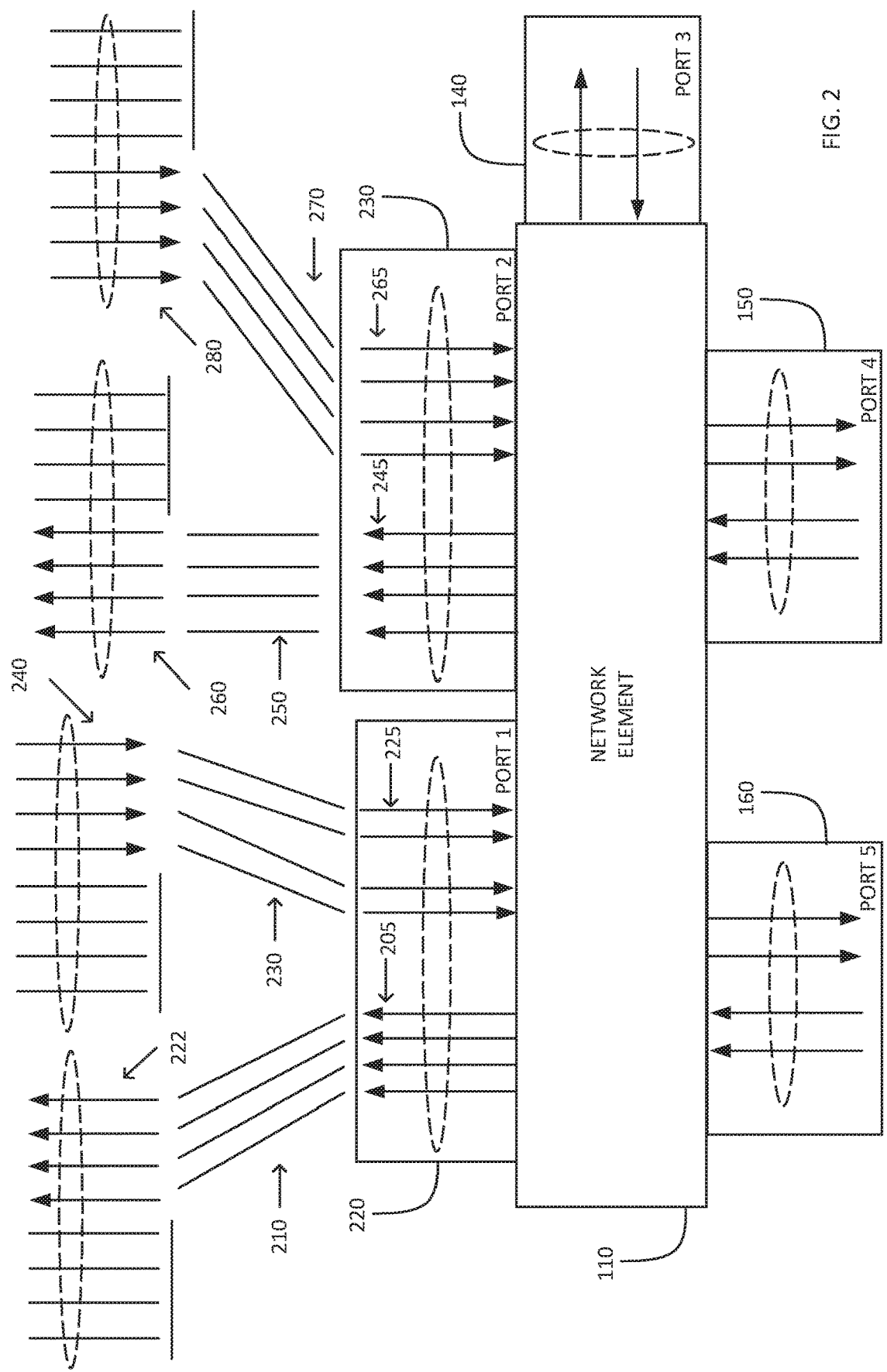
FIG. 2 is a simplified block diagram illustration of a system comprising a network element in wired connection with ports external thereto, the system being constructed and operative in accordance with an exemplary embodiment of the present invention.

Reference is now made to FIG. 2, which is a simplified block diagram illustration of a system comprising a network element in wired connection with ports external thereto, the system being constructed and operative in accordance with an exemplary embodiment of the present invention.

In the exemplary embodiment of FIG. 2, port 1 (reference numeral 220) is depicted as comprising four input data lanes 225 and four output data lanes 205; port 2 (reference numeral 230) is depicted as comprising four input data lanes 265 and four output data lanes 245. For simplicity of depiction and description, port 3 (reference numeral 140), port 4 (reference numeral 150), and port 5 (reference numeral 160) are depicted as in FIG. 1, it being appreciated that those ports may not necessarily be identical or similar to the corresponding ports in FIG. 1.

By way of specific non-limiting example, port 1 (reference numeral 220) is shown as connected as follows:
the output data lanes 205 thereof are connected via a wired connection comprising a plurality of wires 210 to input data lanes of an external port 222 of an external device; and
the input data lanes 225 thereof are connected via a wired connection comprising a plurality of wires 230 to output data lanes of an external port 240 of an external device.

The plurality of wires 210 and the plurality of wires 230 may be comprised in a cable (or in more than one cable); may be comprised in a circuit board (not shown) on which network element 110 is disposed; or may be comprised in a patch panel, as described above.

It will be appreciated that the external port 222 and the external port 240: may be any appropriate external port; may both be comprised in one external device; or may each be comprised in different external devices.

Similarly, port 2 (reference numeral 230) is shown as connected as follows:
the output data lanes 245 thereof are connected via a wired connection comprising a plurality of wires 250 to input data lanes of an external port 260 of an external device; and
the input data lanes 265 thereof are connected via a wired connection comprising a plurality of wires 270 to output data lanes of an external port 280 of an external device.

The plurality of wires 250 and the plurality of wires 270 may be comprised in a cable (or in more than one cable); may be comprised in a circuit board (not shown) on which network element 110 is disposed; or may be comprised in a patch panel, as described above.

It will be appreciated that the external port 260 and the external port 280: may be any appropriate external port; may both be comprised in one external device; or may each be comprised in different external devices.

A non-limiting example of operation of the system of FIG. 2 is now briefly described. It will be appreciated, first considering the non-limiting example of port 1 (reference numeral 220) that because the output data lanes 205 are connected to the external port 222, while the input data lanes 225 are connected to the external port 240, the inefficiencies described above with reference to FIG. 1 may be overcome: in the particular example of port 1 (reference numeral 220), and considering a particular example in which input comes from the external port 240 and output is directed to the external port 222, port 1 (reference numeral 220) is thus enabled to achieve up to its full throughput. The same is true, mutatis mutandis, regarding port 2 (reference numeral 230).

Figure 3A:
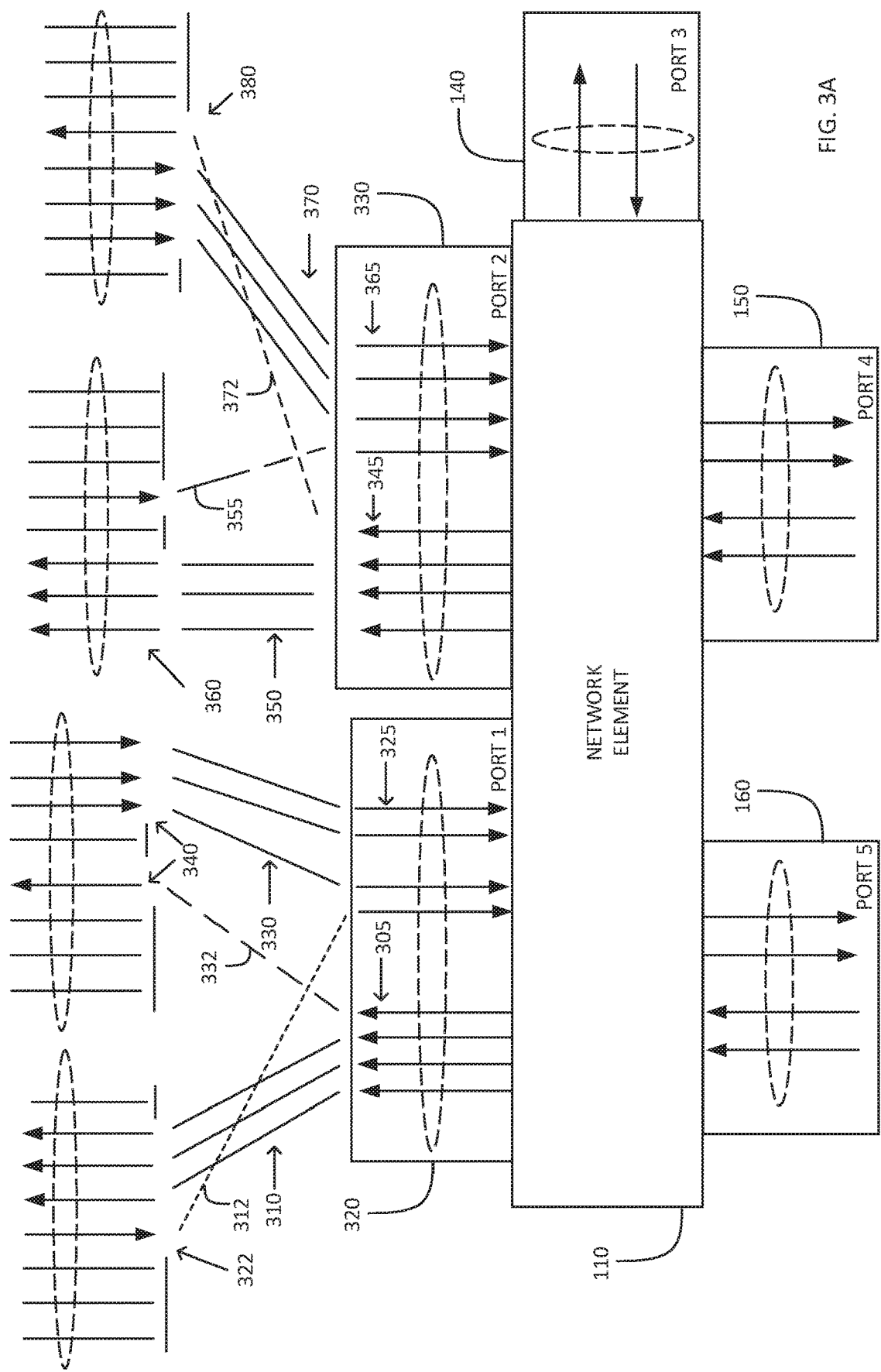
FIG. 3A is a simplified block diagram illustration of a system comprising a network element in wired connection with ports external thereto, the system being constructed and operative in accordance with another exemplary embodiment of the present invention.

Reference is now made to FIG. 3A, which is a simplified block diagram illustration of a system comprising a network element in wired connection with ports external thereto, the system being constructed and operative in accordance with another exemplary embodiment of the present invention.

In the exemplary embodiment of FIG. 3A, port 1 (reference numeral 320) is depicted as comprising four input data lanes 325 and four output data lanes 305; port 2 (reference numeral 330) is depicted as comprising four input data lanes 365 and four output data lanes 345. For simplicity of depiction and description, port 3 (reference numeral 140), port 4 (reference numeral 150), and port 5 (reference numeral 160) are depicted as in FIGS. 1 and 2, it being appreciated that those ports may not necessarily be identical or similar to the corresponding ports in FIGS. 1 and 2.

By way of specific non-limiting example, port 1 (reference numeral 320) is shown as connected as follows:
three of the output data lanes 305 thereof are connected via a wired connection comprising a plurality of wires 310 to input data lanes of an external port 322 of an external device, while one of the output data lanes 305 thereof is connected via a wired connection comprising a wire 332 to an input data lane of an external port 340 of an external device; and
three of the input data lanes 325 thereof are connected via a wired connection comprising a plurality of wires 330 to output data lanes of the external port 340 of an external device, while one of the input data lines 325 thereof is connected via a wired connection comprising a wire 312 to an output data lane of the external port 322.

The plurality of wires 310, the plurality of wires 330, the wire 312, and the wire 332 may be comprised in a cable (or in more than one cable); may be comprised in a circuit board (not shown) on which network element 110 is disposed; or may be comprised in a patch panel, as described above.

It will be appreciated that the external port 322 and the external port 340: may be any appropriate external port; may both be comprised in one external device; or may each be comprised in different external devices.

Similarly, port 2 (reference numeral 330) is shown as connected as follows:

three of the output data lanes 345 thereof are connected via a wired connection comprising a plurality of wires 350 to input data lanes of an external port 360 of an external device, while one of the output data lanes 345 thereof is connected via a wired connection comprising a wire 372 to an input data lane of an external port 380 of an external device; and three of the input data lanes 365 thereof are connected via a wired connection comprising a plurality of wires 370 to output data lanes of the external port 380 of an external device, while one of the input data lines 365 thereof is connected via a wired connection comprising a wire 355 to an output data lane of the external port 360.

The plurality of wires 350, the plurality of wires 337, the wire 355, and the wire 372 may be comprised in a cable (or in more than one cable); may be comprised in a circuit board (not shown) on which network element 110 is disposed; or in a patch panel, as described above.

It will be appreciated that the external port 322 and the external port 340: may be any appropriate external port; may both be comprised in one external device; or may each be comprised in different external devices.

A non-limiting example of operation of the system of FIG. 3A is now briefly described. The non-limiting example of the system of FIG. 3A may be useful in a situation where network requirements are asymmetrical. In such a case, (unlike in the case of, by way of non-limiting example, port 1 (reference numeral 220) of FIG. 2, as described above), it may not be desirable or may not be optimal to connect all of the outgoing data lanes of a given port to one external port, and all of the incoming data lanes of a given port to another external port, as described above with reference to FIG. 2. Rather, it may be desirable and/or optimal to connect (referring to outgoing lanes by way of non-limiting example) some of the outgoing data lanes to one external port, and some of the outgoing data lanes to another external port, this situation being depicted in FIG. 3A and described above. It is appreciated that, without limiting the generality of embodiments of the present invention, the number of lanes allocated to any given port may be different from the number of lanes allocated to any other given port.

It is further appreciated that one or more lanes may be used for management and signaling between port/s such as (by way of a particular non-limiting example) port 3 (reference numeral 140) and one or more external ports. Such management and signaling could in some non-limiting embodiments comprise, by way of non-limiting example, "training" messages used to initiate a port, and periodic messages indicating that a port is still "alive".

Figure 3B:
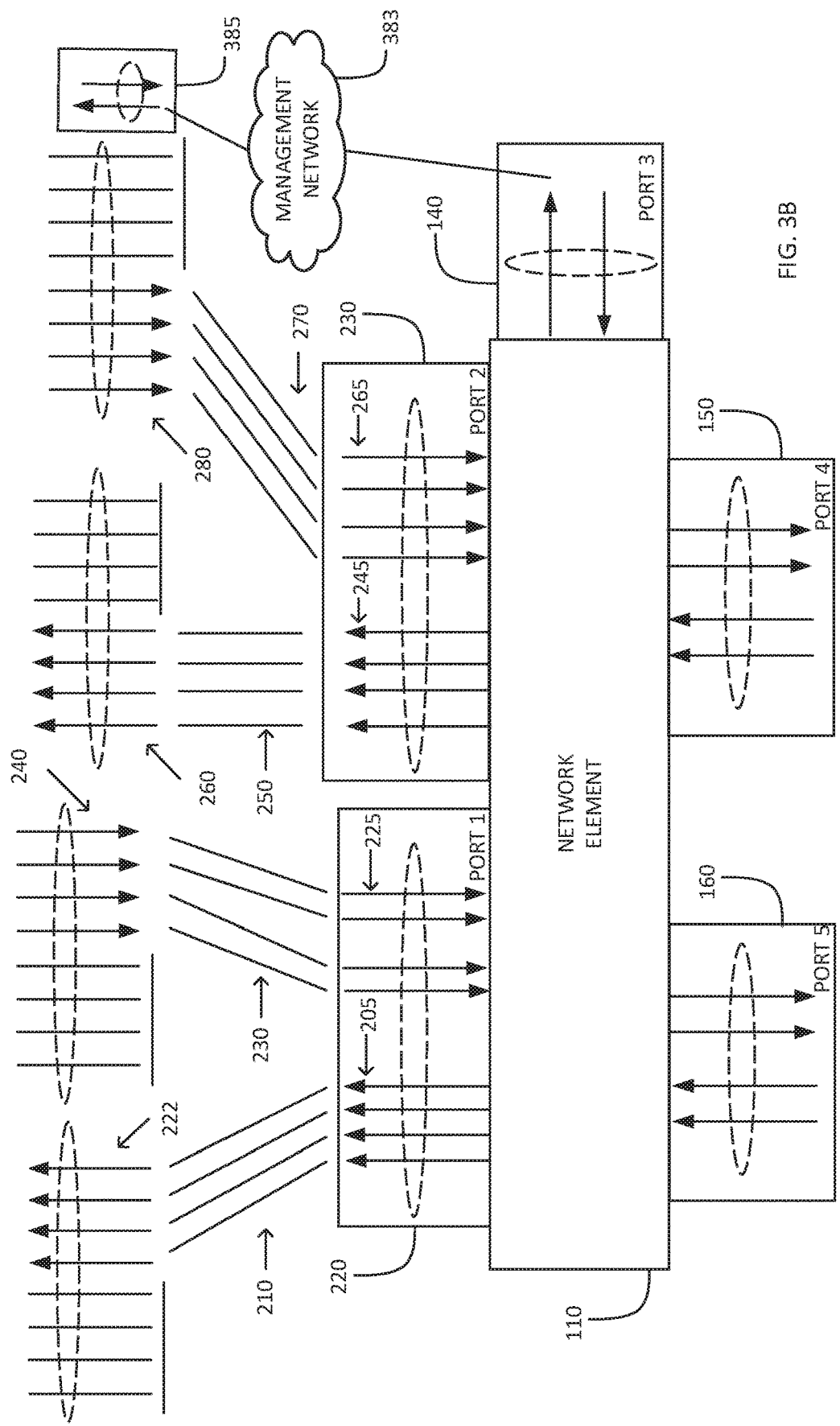
FIG. 3B is a simplified block diagram illustration of a system comprising a network element in wired connection with ports external thereto, the system being constructed and operative in accordance with still another exemplary embodiment of the present invention.

Reference is now additionally made to FIG. 3B, which is a simplified block diagram illustration of a system comprising a network element in wired connection with ports external thereto, the system being constructed and operative in accordance with still another exemplary embodiment of the present invention. The system of FIG. 3B is similar to the system of FIG. 2, with addition of a management network 383 providing communication between a lane of port 3 (reference numeral 140) and a management port 385 on an external device. For the sake of simplicity of description, only a single management port 385 on an external device is shown, it being appreciated that a plurality of such management ports on different external devices could be so managed via the management network 383.

Figure 3C:
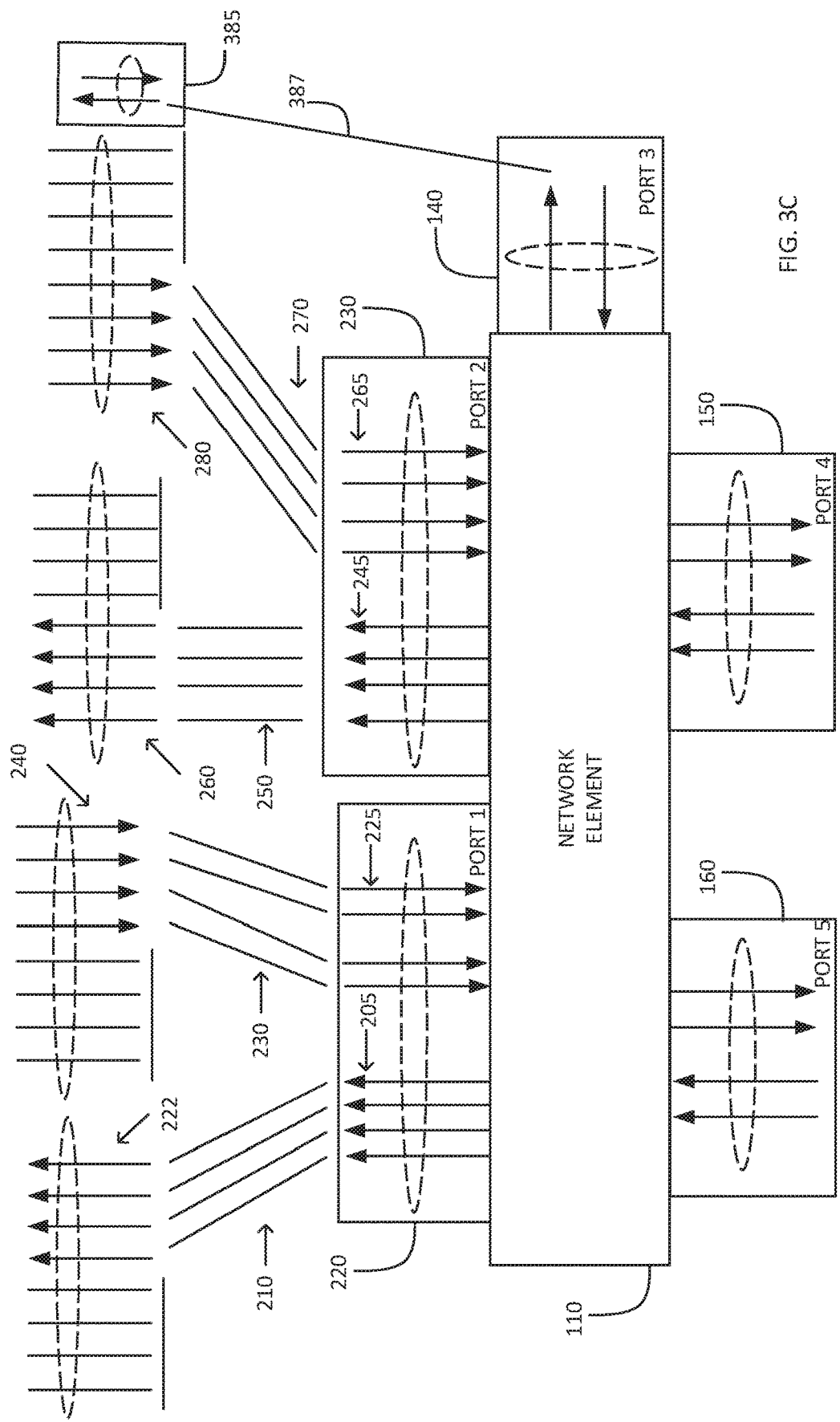
FIG. 3C is a simplified block diagram illustration of a system comprising a network element in wired connection with ports external thereto, the system being constructed and operative in accordance with yet another exemplary embodiment of the present invention.

Reference is now additionally made to FIG. 3C, which is a simplified block diagram illustration of a system comprising a network element in wired connection with ports external thereto, the system being constructed and operative in accordance with yet another exemplary embodiment of the present invention. In the system of FIG. 3C, by contrast to the system of FIG. 3B, a wired connection 387 is used to provide communication between a lane of port 3 (reference numeral 140) and the management port 385 on an external device. For the sake of simplicity of description, only a single management port 385 on an external device is shown, it being appreciated that a plurality of such management ports on different external devices could be so managed; however, due to the absence of the management network 383 (FIG. 3B) and the possibility that a plurality of management ports would need to be management, the exemplary embodiment of FIG. 3C might be less desirable than that of FIG. 3B, by reason of requiring more and more complex wiring.

Returning to the description of FIG. 3A, it will be appreciated, first considering the non-limiting example of port 1 (reference numeral 320) that because three the output data lanes 305 are connected to the external port 322, with one of the output data lanes 305 being connected to the external port 340; while three of the input data lanes 325 are connected to the external port 340, with one of the input data lanes 325 being connected to the external port 322, the following may be achieved:

asymmetrical network requirements, as described above, have been dealt with; and the inefficiencies described above with reference to FIG. 1 may be overcome, although the net increase in throughput in the non-limiting examples of FIGS. 3A and 3B may be less than the net increase in throughput in the non-limiting example of FIG. 2, as described above.

The same is true, mutatis mutandis, regarding port 2 (reference numeral 330).

Referring to the above description of FIGS. 2 and 3A, and without limiting the generality of exemplary embodiments of the present invention, and by way of particular non-limiting example only, one or more of port 3 (reference numeral 140), port 4 (reference numeral 150), and port 5 (reference numeral 160) may be used, for example: to initialize and/or to exchange parameters for the health of an external port (such as, by way of particular non-limiting example, external ports 322, 340, 360, and/or 380 of FIG. 3A; the same applying mutatis mutandis to external ports depicted and described in and with reference to FIG. 2).

It is appreciated that, in the depictions of FIGS. 2, 3A, and 3B and in the above description thereof, certain numbers of input data lanes, output data lanes, and the like have been depicted and described, but those numbers are not limiting, it being specifically appreciated that any appropriate number of such data lanes may be used.

Figure 4:
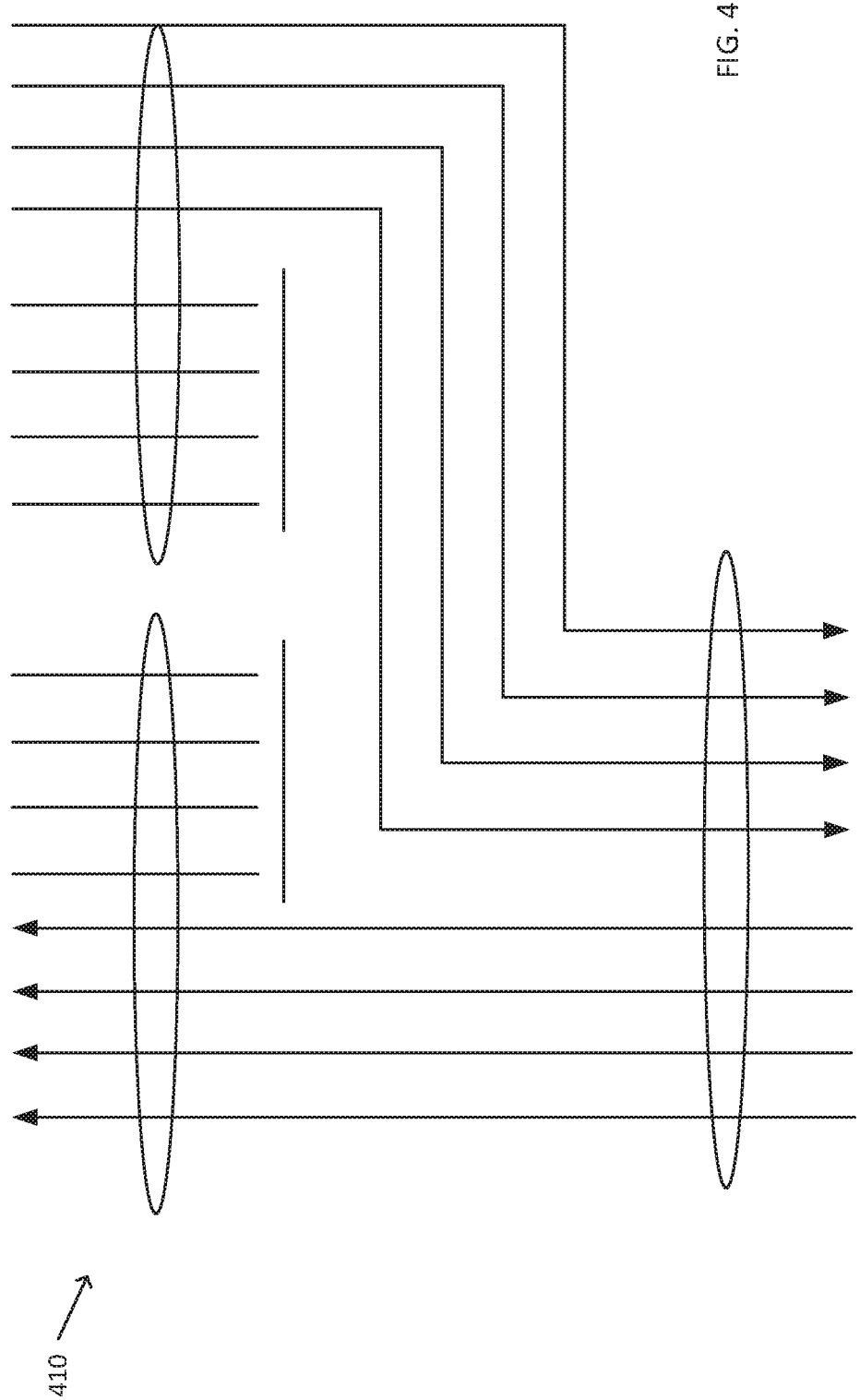
FIG. 4 is a simplified schematic diagram of a wiring arrangement suitable for use with certain exemplary embodiments of the present invention.
Figure 5:
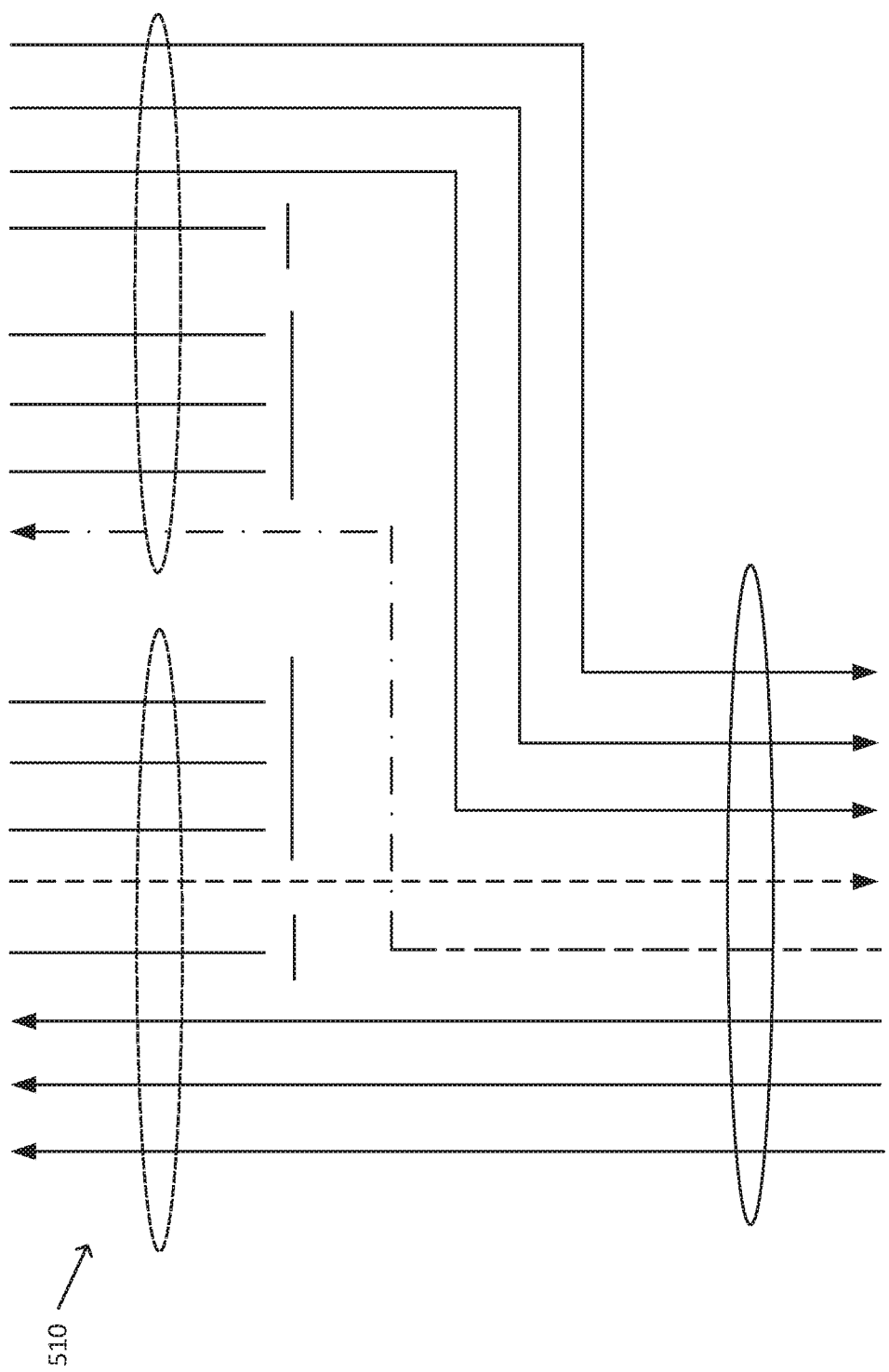
FIG. 5 is another simplified schematic diagram of a wiring arrangement suitable for use with certain exemplary embodiments of the present invention.

Reference is now made to FIG. 4, which is a simplified schematic diagram of a wiring arrangement suitable for use with certain exemplary embodiments of the present invention; and to FIG. 5, which is another simplified schematic diagram of a wiring arrangement suitable for use with certain exemplary embodiments of the present invention.

The wiring arrangement of FIG. 4 is generally designated 410, while the wiring arrangement of FIG. 5 is generally designated 510. Each of the wiring arrangement 410 and the wiring arrangement 510 may be: comprised in a cable (or in more than one cable); may be comprised in a circuit board (not shown) on which network element 110 is disposed; or may be comprised in a patch panel, as described above.

Referring back to FIG. 2 and to FIG. 3A, it will be evident that the wiring arrangement 410 may be suitable for use with the system of FIG. 2, while the wiring arrangement 420 may be suitable for use with the system of FIG. 3A. In particular, the wiring arrangement 410 may comprise an exemplary embodiment (by way of non-limiting example) of the plurality of wires 210 (FIG. 2) and the plurality of wires 230 (FIG. 2). Similarly, the wiring arrangement 510 may comprise an exemplary embodiment (by way of non-limiting example) of one or both of: the plurality of wires 310 and the wire 312; and the plurality of wires 330 and the wire 332. It will be appreciated that the writing arrangement 410 may be used elsewhere in the system of FIG. 2, and the wiring arrangement 510 may be used elsewhere in the system of FIG. 3A. Furthermore, persons skilled in the art will appreciate how to produce wiring arrangements for other exemplary embodiments of the present invention, such as, by way of non-limiting example, the system of FIG. 3B.

Reference is now made to FIG. 6, which is a simplified flowchart diagram of an exemplary method of operation of the systems of FIGS. 2, 3A, 3B, and 3C. The exemplary method of FIG. 6 includes the following steps:

A network element is provided. The network element has an input-output port (it being appreciated that there may be more than one input-output ports). The input-output port has an input data lane and an output data lane (it being appreciated that there may be more than one input data lane, and more than one output data lane). (Step 610)

Data communication to the input data lane is received, from a network data source which is external to the network element. (Step 620)

The output data lane communicates to a network data destination which is external to the network element. The network data source and the network data destination are distinct from each other. By way of particular non-limiting example, the network data source and the network data destination may be: two different ports on a device external to the network element; or two ports on two distinct devices which are both external to the network element. (Step 630)

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. Apparatus comprising:
   a network element comprising a plurality of input-output ports each having a first plurality of input data lanes and a second plurality of output data lanes, wherein:
   at least some of the first plurality of input data lanes are in wired connection with a network data source external to the network element,
   at least some of the second plurality of output data lanes are in wired connection with a network data destination external to the network element, and
   for at least one of said plurality of input-output ports:
      at least some of the first plurality of input data lanes of said at least one of said plurality of input-output ports are in wired connection with the network data source, and
      at least some of the second plurality of output data lanes of said at least one of said plurality of input-output ports are in wired connection with the network data destination.

2. Apparatus according to claim 1 and wherein the network data source is comprised in a first device external to the apparatus, and
   the network data destination is comprised in a second device external to the apparatus, and
   the first device is distinct from the second device.

3. Apparatus according to claim 1 and wherein the network data source is comprised in a first device external to the apparatus, and
   the network data destination is comprised in a second device external to the apparatus, and
   the first device is the same as the second device.

4. Apparatus according to claim 1 and wherein said wired connection comprises at least one of the following: wiring on a circuit board to which the apparatus is attached; a cable; and a patch panel.

5. Apparatus according to claim 1 and wherein said network element comprises a switch.

6. Apparatus according to claim 1 and wherein said network element comprises a network interface card.

7. Apparatus according to claim 1 and wherein said network element is configured to provide management communications via at least one of the following: a direct wired connection; and a connection via a management network.

8. Apparatus according to claim 1, and wherein said network element is configured to provide a plurality of speeds by providing at least one of the following:
   at least one of the first plurality of input data lanes being configured to operate at a speed different from at least one other of the first plurality of input data lanes; and
   at least one of the second plurality of output data lanes being configured to operate at a speed different from at least one other of the second plurality of output data lanes.

9. A method comprising:
   providing a network element comprising a plurality of input-output ports each having a first plurality of input data lanes and a second plurality of output data lanes;
   at least some of the first plurality of input data lanes receiving data communication, via a wired connection from a network data source external to the network element; and
   at least some of the second plurality of output data lanes communicating by sending data, via a wired connection, to a network data destination external to the network element, wherein
   the network data source is distinct from the network data destination.

10. The method according to claim 9 and wherein the network data source is comprised in a first device external to the apparatus, and
    the network data destination is comprised in a second device external to the apparatus, and
    the first device is distinct from the second device.

11. The method according to claim 9 and wherein the network data source is comprised in a first device external to the apparatus, and the network data destination is comprised in a second device external to the apparatus, and the first device is the same as the second device.

12. The method according to claim 9 and wherein said wired data connection comprises at least one of the following: wiring on a circuit board to which the apparatus is attached; a cable; and a patch panel.

13. The method according to claim 9 and wherein said network element comprises a switch.

14. The method according to claim 9 and wherein said network element comprises a network interface card.

15. The method according to claim 9 and also comprising said network element providing management communications via at least one of the following: a direct wired connection; and a connection via a management network.

16. The method according to claim 9 and also comprising said network element providing a plurality of speeds by at least one of the following:

at least one of the first plurality of input data lanes being configured to operate at a speed different from at least one other of the first plurality of input data lanes; and at least one of the second plurality of output data lanes being configured to operate at a speed different from at least one other of the second plurality of output data lanes.

\* \* \* \* \*